Feb. 4, 1941.   W. R. BECHER   2,230,479
MEASURING DEVICE
Filed July 7, 1939
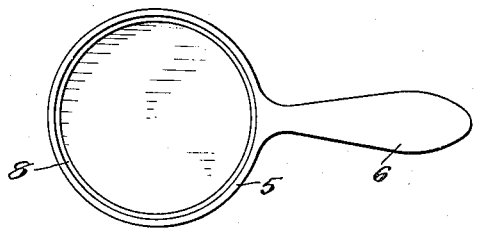
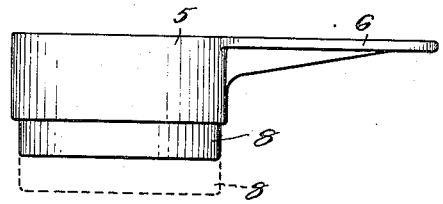
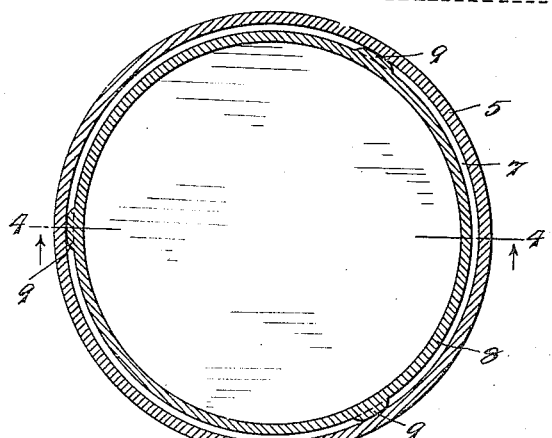
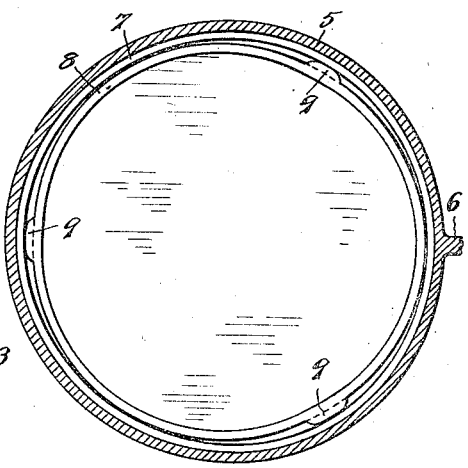
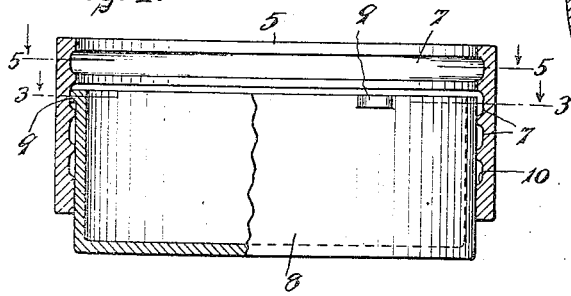
Inventor
WESLEY B. BECHER.
By Louis V. Lucia
Attorney Patented Feb. 4, 1941

2,230,479

UNITED STATES PATENT OFFICE 2,230,479

MEASURING DEVICE

Wesley R. Becher, Wethersfield, Conn., assignor to The Silex Company, Hartford, Conn., a corporation of Connecticut Application July 7, 1939, Serial No. 283,212

6 Claims. (Cl. 73—166)

This invention relates to a measuring device which is primarily intended for use in measuring coffee or other similar materials.

In the brewing of coffee, it is well-known that the results obtained depend largely upon the use of the proper amount of coffee for each cup to be brewed. For instance, it is generally recommended that one tablespoonful of coffee be used for each cup to be brewed. This, however, is not sufficient to warrant the best results, for the reason that when a tablespoonful of finely ground coffee is used an entirely different brew will be obtained than when a spoonful of coarser coffee is used.

In order to obtain the most satisfactory brews from coffees of different grades of roasts or grounds, it is highly important that the quantity of the coffee be measured in accordance to its grade. Where a finely ground or darkly roasted grade of coffee is used, the measure should be smaller than where a coarsely ground or lightly roasted grade is used. In other words, the size of the measure should be in accordance with the grade of coffee used, in order to obtain the best results.

An object of my invention, therefore, is to provide a measure which is particularly adapted for measuring coffee and which is adjustable for different capacities so that it may be adjusted to correspond with the grade of the coffee to be used.

A further object of my invention is to provide such a measure which is simple in construction, economical to produce and readily adjustable to different capacities for measuring different grades of coffee.

Further objects of my invention will be clearly understood from the following description and from the accompanying drawing in which—

Figure 1 is a plan view of a measure embodying my invention.

Figure 2 is a side view of the same in elevation.

Figure 3 is a plan view in section on line 3—3 of Figure 4.

Figure 4 is a view, partly in central vertical section, on line 4—4 of Figure 3.

Figure 5 is a view on line 5—5 of Figure 4, showing the operation of the parts during the adjustment of the measure.

As illustrated in the drawing, the numeral 5 denotes an outer member in the form of a ring, or sleeve, having a suitable handle 6. The interior wall of said sleeve is provided with a series of grooves 7, which are preferably annular.

An inner member 8, preferably in the shape of a cup, fits closely within the outer sleeve 5 and is provided with bosses 9, which are adapted to fit within the grooves 7 and thereby locking the said cup member in adjusted position within the sleeve.

There are preferably three of the bosses 9 provided, in order to facilitate the operation of adjusting the measure as will be hereinafter described. The sides of the grooves 7 are rounded, as at 10, to permit the said bosses to slide over the edges of the grooves when the measure is being adjusted.

The said measure is preferably constructed of a plastic material and is sufficiently thin to provide a degree of resiliency in the parts thereof.

When it is desired to change the position of the cup member 8 with relation to the outer sleeve 5, in order to provide a measure of a different capacity, the said cup is forced in the proper direction. This will cause the three bosses 9 to slide over the edges of the respective groove 7 and into the next groove. In passing over the edges of the grooves, as illustrated in Figure 5, the wall of the cup member 8 will flex slightly inward while the wall of the sleeve 5 will flex outwardly at the points of engagement between the bosses and the inner wall of said sleeve. When the bosses register with a groove, the parts 5 and 8 will resume their original form and provide a closely fitted combination of the outer sleeve and the inner cup member which will prevent leakage of coffee grounds between the two members.

My improved measuring device is easily adjustable for different capacities by merely moving the cup member 8, within the outer sleeve 5, to the position which will provide the proper capacity for the particular grade of coffee that is to be used.

As illustrated in Figure 4, I prefer to provide four of the grooves 7, thus permitting adjustment of the measure for four different grades of coffee.

It will be seen that, by my invention, I have provided an improved measure which may be adjusted for different and pre-determined capacities so that the proper amounts of different grades of coffee may be measured to obtain the best results.

I claim:

1. A measuring device comprising a substantially resilient sleeve having a plurality of horizontal annular grooves in the inner surface thereof, a substantially resilient cup shaped member slidable within said sleeve, a plurality of bosses extending from the outer surface of said cup shaped member on a single plane and adapted to inter-engage with said grooves for inter-locking the said members in different relative positions to provide different capacities for said device; the said members being adapted to flex upon the changing of their relative positions to permit the passing of said bosses from one of said grooves to the next.

2. A measuring device of the character described comprising an inner cup shaped member, an annular outer member slidable on said cup shaped member and having spaced separate annular grooves on the inner surface thereof, bosses on the outer surface of said cup shaped member adapted to fit within said grooves for relatively positioning said member, and rounded surfaces between the sides and bottom of said grooves to permit forcing of said bosses from one of said grooves to another over the sides of said grooves when moving said cup shaped member within the annular member to change the relative position thereof and thereby permit passage of said bosses to the relative groove.

3. A measuring device comprising a cup shaped member, a separate member in the form of a substantially resilient sleeve having a handle thereon, a plurality of grooves in one of said members and extensions in the other of said members adapted to fit within said grooves and to cause flexing of portions of said members in relatively opposite positions, upon forcing of said members in opposite directions, to permit passage of said extensions from one of said grooves to the next and thereby change the relative adjustment between said members to selectively provide different capacities in said device.

4. A measuring device of the character described comprising a cup shaped member, a separate member in the form of a substantially resilient sleeve closely fitting said cup shaped member and slidable relative thereto, means comprising extensions on the walls of one of said members adapted to engage depressions in the wall of the other member; the said extensions being spaced to permit the wall of the member from which they project to cause portions of the wall of the opposite member which are in contact with said projections to flex in opposite directions and thereby permit passage of said extensions from one of said grooves to the next, upon movement of said members in relatively opposite directions, for changing the relative adjustment of said members to selectively provide different capacities in said device.

5. A measuring device of the character described comprising a cup shaped member having a substantially resilient sleeve closely fitting said member, spaced projections on the outer wall surface of the wall of said member adapted to engage recesses in the inner surface of the wall of said sleeve; said projections being located at three points on the wall of said cup member and equally spaced from each other to cause outward flexing of portions of said sleeve in contact with said extensions and inward flexing of portions of the wall of said cup member from which said extensions project and thereby permit relative sliding movement between said members and passage of said projections from one recess to the next for retaining said members in selectively adjusted positions to provide different capacities in said device.

6. A measuring device of the character described comprising a substantially resilient sleeve having a plurality of separate grooves in the inner surface of the wall thereof, a substantially resilient cup-shaped member, and a plurality of spaced projections extending laterally from the outer surface of said member on a substantially even plane with the top of said member and adapted to inter-engage with said grooves and resiliently inter-locking said member and sleeve in different relative positions.

WESLEY R. BECHER.